United States Patent
Lv

(10) Patent No.: US 8,636,310 B2
(45) Date of Patent: *Jan. 28, 2014

(54) LOCKING ARRANGEMENT AND CULINARY UTENSIL COMPRISING SAME

(75) Inventor: Bing Yuan Lv, Guangdong (CN)

(73) Assignee: Maxpat Trading and Marketing (Far East) Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,770

(22) Filed: Jun. 8, 2012

(65) Prior Publication Data

US 2013/0049387 A1  Feb. 28, 2013

Related U.S. Application Data

(63) Continuation-in-part of application No. 13/222,417, filed on Aug. 31, 2011, now Pat. No. 8,226,135.

(51) Int. Cl.
*A47G 21/10* (2006.01)
*A47J 43/28* (2006.01)

(52) U.S. Cl.
USPC ............... 294/16; 294/99.2; 294/110.1

(58) Field of Classification Search
USPC ........ 294/3, 5, 7, 8, 8.5, 11, 16, 33, 100, 106, 294/116, 117; D7/686
See application file for complete search history.

(56) References Cited

U.S. PATENT DOCUMENTS

| | | | | |
|---|---|---|---|---|
| 3,211,488 A | * | 10/1965 | Duranel | 294/99.2 |
| 6,056,338 A | | 5/2000 | Kerr | |
| 6,089,631 A | * | 7/2000 | Thurlow et al. | 294/16 |
| 6,092,847 A | | 7/2000 | Kwan | |
| 7,086,676 B2 | | 8/2006 | Sumter et al. | |
| 7,316,434 B1 | | 1/2008 | Kerr | |
| 7,637,547 B2 | | 12/2009 | Schneider | |
| 8,226,135 B1 | * | 7/2012 | Lv | 294/16 |

* cited by examiner

*Primary Examiner* — Paul T Chin
(74) *Attorney, Agent, or Firm* — Heslin Rothenberg Farley & Mesiti P.C.

(57) ABSTRACT

Disclosed is a locking arrangement having a first wall defining a first surface and a second wall defining a second surface, with the first and second surfaces abutting each other; a mechanism for locking the first wall against the second wall; and a movable member. The first wall and the second wall are configured to define an enclosed channel for accommodating the movable member such that the movable member is slidable within the channel, and wherein the locking arrangement may assume one of two configurations, in that in one of the two configurations said walls are prevented from moving relative to each other by the movable member and in the other configuration said walls and hence the arms extended therefrom are movable relative to each other.

20 Claims, 3 Drawing Sheets

Section A-A'

LOCKING ARRANGEMENT AND CULINARY UTENSIL COMPRISING SAME

RELATED APPLICATION

The present invention is a continuation-in-part application from U.S. patent application Ser. No. 13/222,417 filed Aug. 31, 2011, content of which is incorporated in the present application in its entirety.

FIELD OF THE INVENTION

The present invention is concerned with a locking arrangement and a utensil comprising such arrangement; the invention is in particular concerned with but not limited to a culinary utensil comprising such arrangement. The culinary utensil may be a culinary tong or clamp.

BACKGROUND OF THE INVENTION

There are a variety of conventional tong or clamp like-utensils for picking up an object. In the context of culinary utensils, for example a culinary tong, the tong may be used for picking up food objects. Such utensils typically have a pair of arms or extensions connected together at a pivot joint. A biasing means may be provided to bias the arms to a far apart configuration. In use, when a food object is to be picked up the arms are firstly allowed to be spread out. Then when the food object is located between the front ends of the arms and the arms are squeezed together and the food object can be held tight by the arms. In order to maintain the position, the arms have to be held firmly together by the fingers and the palm of a user. This can be difficult in particular if the means for biasing the arms apart are particularly strong because the fingers and palm would have to act against the biasing force of the biasing means. The holding of the arms together would be particularly difficult if the food object being held is heavy or the food object is to be held for a prolong period of time.

Another problem with conventional tong or clamp like-utensils is that when they are not in use, the arms are biased to spread apart. As such, the utensils become larger and difficult to stow. One solution has been to provide a ring for holding the arms together. However, the ring can be difficult to maneuver and is generally not reliable and it is not aesthetically pleasant either.

It may be possible to introduce an actuation lock so that on pressing, sliding or pulling of a switch thereof the arms can be locked to stay close together. However, the working of the actuation lock can be adversely interfered when the utensil is used to pick with food objects with grease or sauce. The grease or sauce can hinder working of moving parts or the switch. Further, maneuvering food with such utensil and controlling locking of the arms simultaneously can be difficult.

The present invention seeks to address the above problems or at least to provide an alternative to the public.

SUMMARY OF THE INVENTION

According to a first aspect of the present invention, there is provided a tong or clamp apparatus for picking up an object, comprising a) a first wall from which a first arm extends, b) a second wall from which a second arm extends, the second arm connected to and pivotably movable relative to said first arm for picking up an object or releasing the object from the arms, and c) means for locking said first arm against the second arm, the locking means including a movable member, wherein i) the first wall and the second wall together define an enclosed channel for containing the movable member and within which the movable member is slidable in response to gravity and orientation of the apparatus, and ii) the locking means is adapted to assume a first configuration in which the movable member is positioned at one end of the channel or a second configuration in which the movable member is positioned at the opposite end of the channel, in that in one of the two configurations the walls and hence the arms are prevented from moving relative to each other by the movable member and in the other configuration the walls and hence the arms are movable relative to each other. With such an arrangement, the locking or unlocking of the walls can be achieved by manipulating the orientation of the apparatus such that the ball bearing is moved to a desired location in the channel by gravity—no addition of an actuation switch or pressing of such actuation switch by the thumb or fingers of the user is required. In other words, the locking or unlocking of the walls or the arms can be achieved in a one-hand operation.

Preferably, the movable member may be in the form of a ball bearing.

In an embodiment, the first wall and the second wall may be disposed at a rear end of the first arm and the second arm. The first wall may define a first groove and the second wall may define a second groove, the grooves together defining the channel within which the movable member slides.

In one embodiment, the first wall may include a first bulge defining the first groove at an inwardly facing side thereof, and the second wall may include a second bulge defining the second groove at an outwardly facing side thereof, one of the first and the second grooves may generally be elongate in shape with substantially same width thereacross, and the other groove may generally be elongate in shape but having a substantially widened end, and in a configuration when the movable member is disposed at the widened end of the groove said arms may be freely movable relative to each other.

In a preferred embodiment, the widened end of the groove may be arranged at a forward position, and/or the first bulge may define a protrusion at an outwardly facing side thereof, and the second bulge may define a protrusion at an inwardly facing side thereof.

In an alternative embodiment, us as claimed in claim 5, each of the first arm, the second arm, the first groove and the second groove generally may define a longitudinal axis along its length. In a particular embodiment, the longitudinal axis of the first arm and the longitudinal axis of the first groove may generally be arranged in parallel with each other, and in the second configuration the longitudinal axis of the first arm and the longitudinal axis of the second groove may generally be arranged in parallel with each other.

The apparatus may comprise a pair of the first walls and a pair of the second walls, and the pair of the second walls is sandwiched by the pair of the first walls.

The apparatus may comprise means for biasing the first member and the second member away from each other, e.g. a spring.

The apparatus may comprise a pin extending across the first wall, the second wall and the biasing means.

The first arm and the second arm may be movable relative to each other at a pivot axis, and the channel being generally elongate in profile extends across the pivot axis.

The apparatus may be a culinary tong or clamp.

According to a second aspect of the present invention, there is provided a locking structure comprising first wall from which a first arm extends, a second wall from which a second arm extends, with the second wall connected to and pivotably movable relative to the first wall, and mechanism for locking the first wall against the second wall, the locking mechanism including a movable member, wherein i) the first wall and the second wall together define an enclosed channel for containing the movable member and within which the movable member is slidable in response to gravity and orientation of the apparatus; and the locking mechanism is adapted to assume a first configuration in which the movable member is positioned at one end of the channel or a second configuration in which the movable member is positioned at the opposite end of the channel, in that in one of the two configurations the walls and hence the arms extended therefrom are prevented from moving relative to each other by said movable member and in the other configuration the walls and hence the arms extended therefrom are movable relative to each other.

According to a third aspect of the present invention, there is provided a locking arrangement comprising a first wall defining a first surface and a second wall defining a second surface with the first second surfaces abutting each other, mechanism for locking the first wall against said second wall, and a movable member, wherein the first wall and the second wall are configured to define an enclosed channel for accommodating the movable member such that the movable member is slidable within the channel in response to gravity to the movable member and orientation of the locking arrangement whereby locking or unlocking of locking arrangement is determined by the position of the movable member within the channel, and wherein the locking arrangement is adapted to assume a first configuration in which the movable member is positioned at one end of the channel or a second configuration in which the movable member is positioned at the opposite end of the channel, in that in one of the two configurations the walls are prevented from moving relative to each other by the movable member and in the other configuration the walls and hence the arms extended therefrom are movable relative to each other.

Preferably, the locking structure or arrangement may be free of an actuable member for controlling locking status thereof. The first wall and the second wall may be movable relative to each other at a pivot axis, and the channel being generally elongate in profile may extend across the pivot axis.

BRIEF DESCRIPTION OF DRAWINGS

Some embodiments of the present invention will now be explained, with reference to the accompanied drawings, in which:

FIG. 4b is a schematic cross section view showing a portion of FIG. 4a; and

DETAILED DESCRIPTION OF PREFERRED EMBODIMENTS OF THE INVENTION

The present invention is concerned with a locking arrangement, a locking mechanism or a locking structure, and a utensil comprising such an arrangement, mechanism or structure. The use of arrangement, mechanism and structure hereinafter is interchangeable.

Figure 1:
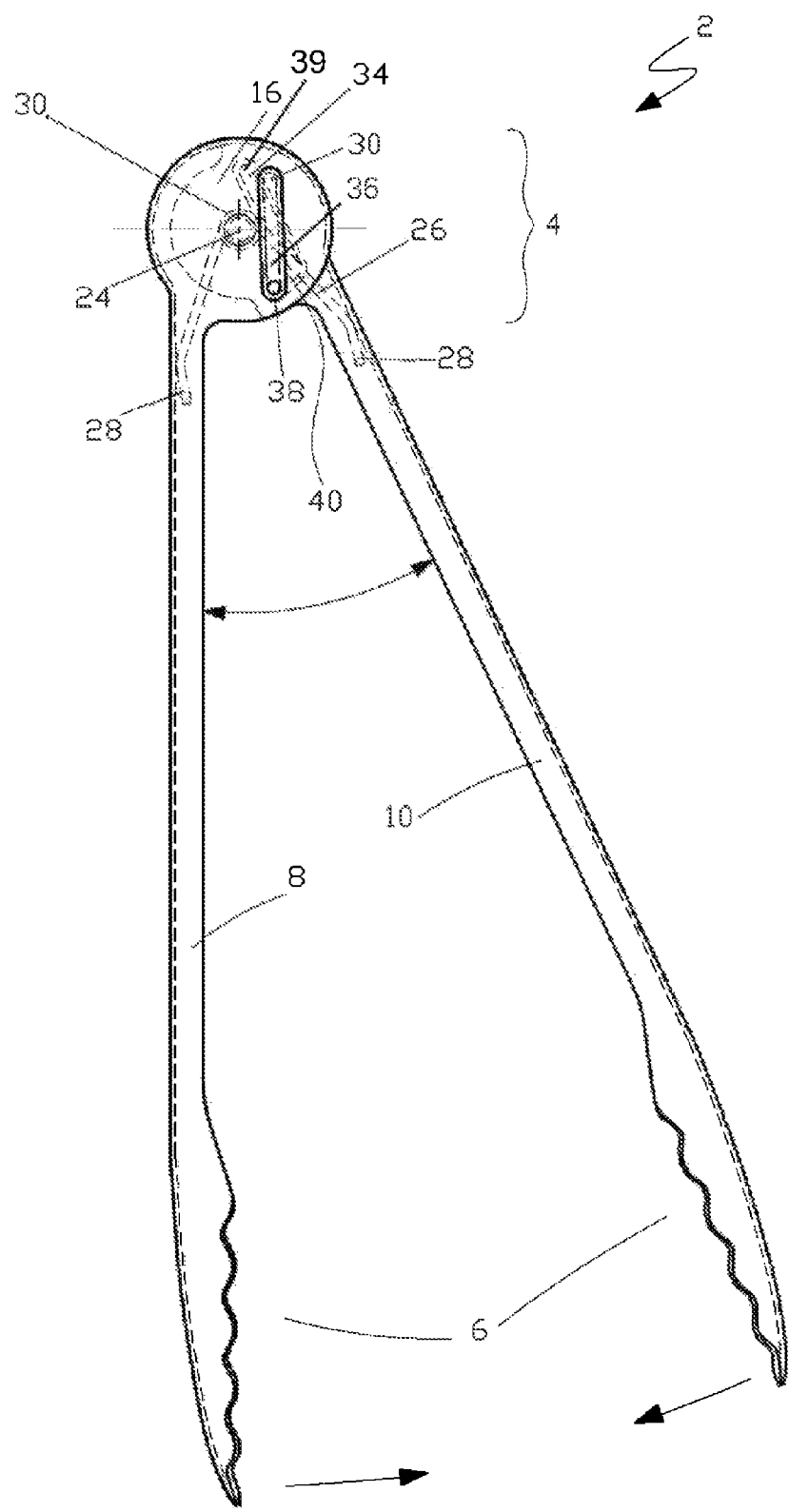
FIG. 1 is a schematic (side) view showing an embodiment of a culinary tong disposed in a certain configuration according to the present invention.

FIG. 1 is a schematic view of a pair of culinary tongs or a tong, generally designated 2, according to an embodiment of the present invention. This schematic view depicts an image of the tong 2 when viewed from a side thereof although the interior construction of a joint and a locking arrangement of the tong 2 located at its rear portion 4 is also depicted schematically.

The tong 2 comprises a front portion or a utility portion 6 having a first arm 8 and a second arm 10. The first arm 8 and the second arm 10 are made of stainless steel plates which have been stamped to conform to a particular shape and curvature. Specifically, in this embodiment, the arms 8, 10 have a predetermined wider front end 12 (also shown in FIGS. 2 and 5) which facilitates picking up of a food object. The corrugated edging 14 at the front end 12 of the arms 8, 10 also facilitates the picking up of a food object.

Figures 2, 3, 5:
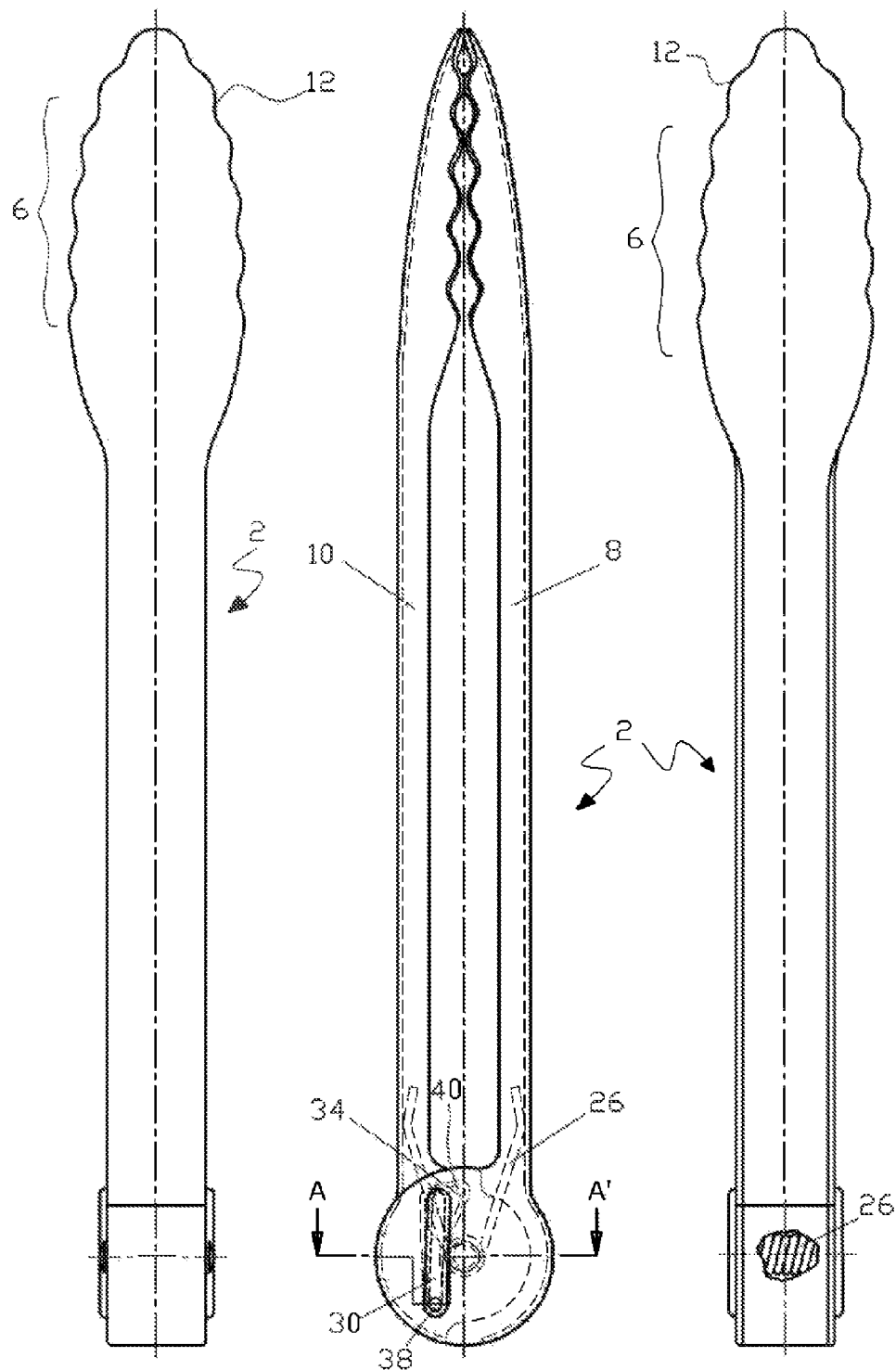
FIG. 2 is a top view of the culinary tong in FIG. 1.
FIG. 3 is a schematic (side) view showing the culinary tong of FIG. 1 but in another configuration.
FIG. 5 is a schematic (bottom) view showing the culinary tong of FIG. 2.

The rear portion 4 of the tong 2 also serves as a handle portion onto which a user grasps in use. The handle portion 4 contains a construction in which a locking mechanism resides. The rear portion 4 of the first arm 8 has a pair of flange-like walls or plates 16, 18 (see also FIG. 4) arranged on opposite lateral sides thereof. In this embodiment, the walls 16, 18 are generally circular in profile, as shown in FIGS. 1 and 3. The rear portion 4 of the second arm 10 similarly has a pair of walls or plate 20, 22 (see FIG. 4a) arranged on opposite lateral sides thereof. The rear portion 4 of the tong 2 is configured such that the walls 20, 22 of the second arm 10 are sandwiched by the walls 16, 18 of the first arm 8.

The first arm 8 and the second arm 10 are pivotably connected together by a pivot pin 24 extending from one lateral side thereof to the opposite side and defining a pivot axis, as shown in FIGS. 1 to 5. With the pivot pin 24, it is to be understood that the first arm 8 and the second arm 10 are pivotably movable relative to each other at the pivot pin 24 within a predetermined range, as shown by the arrows in FIG. 1. The first arm 8 and the second arm 10 while being movable relative to each other cannot spread apart beyond the predetermined range when rear edges of the first arm 8 and the second arm 10 abut each other.

The tong 2 is provided with means for biasing the first arm 8 and the second arm 10 away from each other. In this embodiment, the biasing means takes the form of a wire spring 26 with a shape generally resembling the English letter "V". Please see FIGS. 1, 2, 3 and 4a. The wire spring 26 has two legs 28 and a spring coil 29. The two legs 28 abut an inner surface of the rear end of the first arm 8 and an inner surface of the rear end of the second arm 10, respectively. Due to the inherent biasing nature of the wire spring 26, the arms 8, 10, in the absence of other interference, are biased away from each other, as shown in FIG. 1. As can be seen from the figures and in particular FIG. 4a, the pivot pin 24 extends through the walls 16, 20, the spring coil 29 of the spring 26 and the walls 22, 18.

Figure 4A:
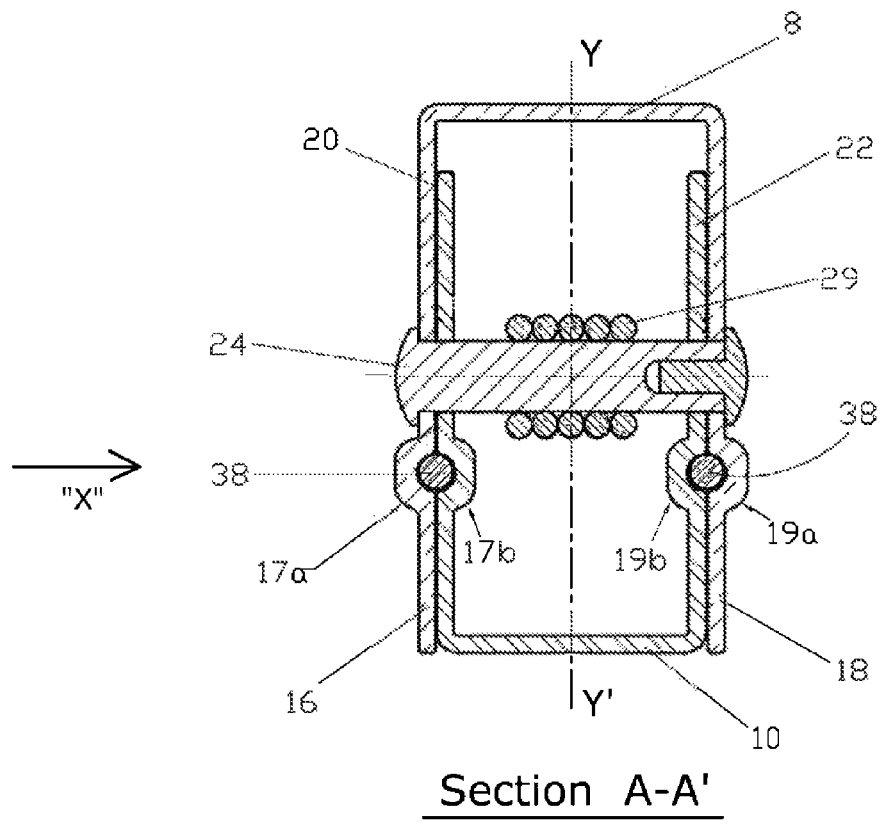
FIG. 4a is a schematic cross section view of a rear end of the culinary tong taken at A-A' of FIG. 3.
Figure 4B:
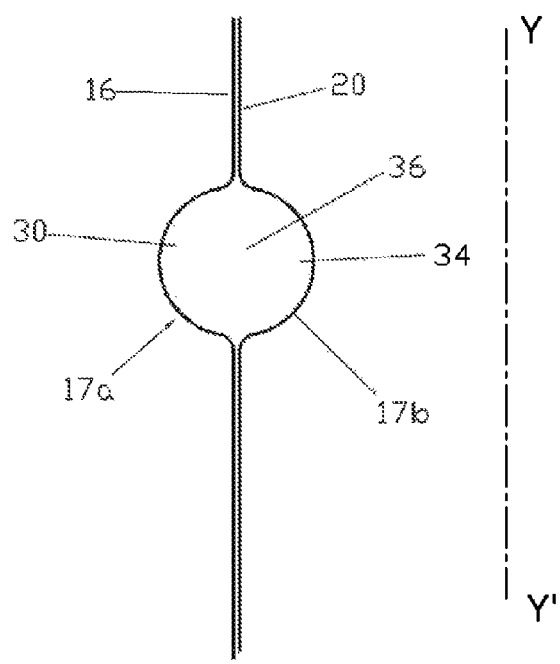

Referring to FIGS. 4a and 4b, the tong 2 is provided with the locking arrangement which serves to control the locking status thereof. The locking arrangement makes use of the walls 16, 18 of the first arm 8 and the walls 20, 22 of the second arm 10. Each wall 16, 18 of the first arm 8 is configured such that there is provided a bulge 17a, 19a. In this embodiment, when the tong 2 is viewed from the side designated by "X" in FIG. 4a, the bulge 17a resembles a protrusion. However, it is to be understood from FIGS. 4a-b that the opposite side of the bulge 17b takes the form of a groove 30. The groove 30 is elongate in shape and has a substantially equal width, and extends from a rear part of the wall 16 to a front part of the wall 16. The elongate groove 30 generally defines a longitudinal axis which is generally in parallel to the longitudinal axis of the first arm 8.

The walls 20, 22 of the second arm 10 are configured such that there is also provided with similar bulges 17b, 19b defining protrusions on one side and grooves 34 on the opposite side. The difference between the bulge 17a of the wall 16 of the first arm 8 and the adjacent bulge 17b of the wall 20 of the second arm 10 is that the protrusion of the bulge 17a of the first arm 8 points away from the tong 2 (or a central axis Y-Y') while the protrusion of the bulge 17b of the second arm 10 points into the tong 2 (or towards the central axis Y-Y'. In other words, the surface of the wall 16 of the first arm 8 defining the groove 30 is inwardly facing (towards the central axis Y-Y') while the surface of the wall 20 of the second arm 10 defining the groove 34 is outwardly facing (away from the central axis Y-Y'). It is to be noted that the meaning of "outwardly" and "inwardly" used herein merely serves to designate the relative orientation and does not limit the meaning to a particular orientation.

As shown in FIG. 4b, the grooves 30, 34 of the walls 16, 20 together define a channel 36 for accommodating a movable member, i.e. a ball bearing 38 in this embodiment.

Referring to FIGS. 1 and 3, it is however to be noted that the grooves 30, 34 are different in a further aspect. While the groove 30 of the first wall 16 is elongate in shape with a generally equal width thereacross, the groove 34 of the second wall 20 is also elongate is shape but with a narrower rear end 39 and a wider front end 40. The wider front end 40 of the groove 34, as shown in FIGS. 1 and 2, resembles a fan shaped configuration. Despite the different configurations of the grooves 30, 34, the grooves 30, 34 are however positioned adjacent each other and together they define the channel 36 for accommodating the ball bearing 38 which is movable therein. The ball bearing is sized to fit in, slidable therein, and would not fall out of the channel 36. In this embodiment, the channel is enclosed for accommodating the ball bearing. One advantage of this enclosed configuration is to minimize the operation of the ball bearing. It is also to be noted that the channel extends across the pivot axis of the pivot joint. As shown in FIG. 4a, in this embodiment the left rear portion of the tong 2 is generally symmetrical to that of the right rear portion of the tong 2. The working of the locking arrangement is now explained as follows.

FIG. 1 illustrates a first configuration of the tong 2 in which the arms 8, 10 are not locked against movement relative each other. In this configuration, the tong 2 is oriented with the front portion 6 or the arms 8, 10 pointing towards the ground and the rear portion 4 pointing upwardly. In other words, the front portion 6 is situated below the pivot pin 24 or the channel 36. By situating below, it means the front portion is situated at a level which is below the level of the pivot pin 24 or the channel 36. It can be seen that due to gravity the ball bearing 38 is positioned at the lowest end of the channel 36 or a forward end of the channel 36 and the arms 8, 10 are biased apart by the wire spring 26. As long as the ball bearing 38 stays in this lowest or forward position in the channel 36, the arms 8, 10 can be brought together freely by squeezing thereof. When the squeezing action is removed the arms 8, 10 return to a biased spread apart configuration. This is because in this configuration the ball bearing 38 is situated in a position which is out of the path of relative movement of the walls. It means that when the tong 2 is oriented with the front portion 6 situated below the channel 36 and a food object is situated between the front end of the arms 8, 10, the arms 8, 10 can be brought together with a squeeze, or when action of the squeeze is remove the food object can be released. In other words, in this orientation, food can be picked up or released freely because the locking arrangement is not activated.

FIG. 3 illustrates a second configuration of the tong 2 in which the arms 8, 10 are brought close to and adjacent each other and they are locked against movement relative each other. In this configuration, the tong 2 is oriented with the front portion 6 or the arms 8, 10 pointing away from the ground and the rear portion 4 pointing downwardly. In other words, the front end 6 of the arms 8, 10 is situated above the channel 36. It can be seen that the ball bearing 38 is positioned at the other end (or the opposite end) or the rear end of the channel 36 and the arms 8, 10 stay close together despite the biasing action of the spring 26. This is because the ball bearing 38 is situated in a location in the channel 36 where it blocks the relative movement of the walls 16, 20. As long as the ball bearing 38 stays in this rear or back position (e.g. when the arms are upwardly pointing) in the channel 36 due to gravity to the ball bearing 28, the arms 8, 10 cannot be spread apart. This is because the ball bearing 38 is located in the path of relative movement of the walls 8, 10. This configuration is suitable when a food object is being held between the arms 8, 10 or when the tong 2 has been stowed away. In this orientation, food can be held between the arms 8, 10 because the locking arrangement has been activated. It is to be understood that the tong 2 does not have to point upwardly and vertically to effect the locking status. As long as the front portion of the tong 2 is situated above the channel, the same locking status can be achieved. The locking can be released by orienting the tong 2 such that the front end 6 of the tong 2 points downwardly or when the front end 6 is situated below the channel 36. With this orientation, the front end 6 of the tong 2 is situated below the channel 36, and a slight squeeze of the arms 8, 10 can unlock the locking mechanism. This is because when the orientation is changed accordingly and the arms 8, 10 are slightly squeezed together, the ball bearing 38 is released and becomes moveable within the channel 36. By gravity the ball bearing 38 rolls from the rear end of the channel 36 to the front end 40 of the channel 36.

In this embodiment, the arms 8, 10 are adapted to be locked in a position half way between a fully spread apart position and a fully closed position. This is achieved by squeezing or bringing and holding the arms 8, 10 to a desired relative position and then orienting the tong 2 such that the arms 8, 10 point upwardly to the extent that the front portion 6 is situated above the channel 36. Once this is done the desired relative position of the arms 8, 10 can be maintained with, for example, the food object held between the arms 8, 10 until the locking arrangement is unlocked.

In this embodiment, each of the first arm 8, the second arm 10, the first groove 30 and the second groove 34 generally defines a longitudinal axis. In the second configuration, the longitudinal axis of the first arm 8 and the longitudinal axis of the first groove 38 or in the second configuration the longitudinal axis of the first arm 6 and the longitudinal axis of the second groove are generally in parallel with each other. In alternative embodiments, this is not necessarily so in that the grooves or the channel may be positioned differently in relation to the arms. In such other embodiments, the locking or unlocking of the locking arrangement is however still determined by the orientation of the channel or the position of the ball bearing. When the ball bearing is positioned in a location or an end of the channel due to gravity where movement of the walls are blocked by the ball bearing the locking arrangement is in its locked position. On the other hand, when the ball bearing is positioned in a location or an (the other) end of the channel (e.g. having a groove with a widened width) the walls are not blocked the locking arrangement is in its unlocked position.

In the above embodiment, the locking arrangement has two pair of walls and two ball bearings in that one wall from each pair of walls and the respective ball bearing act as a locking mechanism. In other words, there are two parallel locking mechanisms on opposite sides of thereof. However, in an alternative embodiment a similar locking arrangement may be provided in which only one pair of adjacent walls and one ball bearing is provided. Such alternative embodiment would also work.

It is envisaged that the above described locking arrangement has only one moving part, i.e. the ball bearing. Manipulation of the moving part is effected by merely moving the utensil in a certain orientation. The ball bearing is enclosed in a channel not easily accessible by, for example, grease, sauce, etc., in that the channel effectively is essentially an enclosed chamber or otherwise insulated or closed from the surroundings. Thus, there is a minimal chance that the arrangement would malfunction.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. For example, while the movable member as depicted in one embodiment may be a ball bearing, any member adapted to be movable in the channel in response to gravity and orientation of the apparatus may be usable. Further, while the channel is defined by a pair of abutting walls and composed of two grooves, any channel defined by two appropriately configured members and sized and adapted to contain the movable member may be used. Also, a skilled person in the art will be aware of the prior art which is not explained in the above for brevity purpose.

The invention claimed is:

1. A tong or clamp apparatus for picking up an object, comprising:—
   a) a first wall from which a first arm extends;
   b) a second wall from which a second arm extends, said second arm connected to and pivotably movable relative to said first arm for picking up an object or releasing the object from said arms; and
   c) means for locking said first arm against said second arm, said locking means including a movable member;
   wherein:—
      i) said first wall and said second wall together define an enclosed channel for containing said movable member and within which said movable member is slidable in response to gravity and orientation of the apparatus; and
      ii) said locking means is adapted to assume a first configuration in which said movable member is positioned at one end of the channel or a second configuration in which said movable member is positioned at the opposite end of the channel, in that in one of the two configurations said walls and hence said arms are prevented from moving relative to each other by said movable member and in the other configuration said walls and hence said arms are movable relative to each other.

2. An apparatus as claimed in claim 1, wherein said movable member is in the form of a ball bearing.

3. An apparatus as claimed in claim 1, wherein said first wall and said second wall are disposed at a rear end of said first arm and said second arm.

4. An apparatus as claimed in claim 1, wherein said first wall defines a first groove and said second wall defines a second groove, the grooves together defining the channel within which the movable member slides.

5. An apparatus as claimed in claim 4, wherein:—
   (i) said first wall includes a first bulge defining the first groove at an inwardly facing side thereof, and said second wall includes a second bulge defining the second groove at an outwardly facing side thereof;
   (ii) one of the first and the second grooves is generally elongate in shape with substantially same width thereacross, and the other groove is generally elongate in shape but having a substantially widened end; and
   (iii) in a configuration when the movable member is disposed at the widened end of the groove said arms are freely movable relative to each other.

6. An apparatus as claimed in claim 5, wherein the widened end of the groove is arranged at a forward position.

7. An apparatus as claimed in claim 5, wherein said first bulge defines a protrusion at an outwardly facing side thereof, and said second bulge defines a protrusion at an inwardly facing side thereof.

8. An apparatus as claimed in claim 5, wherein each of said first arm, said second arm, the first groove and the second groove generally defines a longitudinal axis along its length.

9. An apparatus as claimed in claim 8, wherein the longitudinal axis of said first arm and the longitudinal axis of the first groove are generally arranged in parallel with each other, and in the second configuration the longitudinal axis of said first arm and the longitudinal axis of the second groove are generally arranged in parallel with each other.

10. An apparatus as claimed in claim 1, comprising a pair of said first walls and a pair of said second walls, and the pair of said second walls is sandwiched by the pair of the first walls.

11. An apparatus as claimed in claim 1, comprising means for biasing said first member and said second member away from each other.

12. An apparatus as claimed in claim 11, comprising a pin extending across said first wall, said second wall and said biasing means.

13. An apparatus as claimed in claim 1, wherein said first arm and said second arm are movable relative to each other at a pivot axis, and the channel being generally elongate in profile extends across the pivot axis.

14. An apparatus as claimed in claim 1, wherein the apparatus is a culinary tong or clamp.

15. A locking structure, comprising:—
   a) a first wall from which a first arm extends;
   b) a second wall from which a second arm extends, said second wall connected to and pivotably movable relative to said first wall; and
   c) mechanism for locking said first wall against said second wall, said locking mechanism including a movable member;
   wherein:—
      (i) said first wall and said second wall together define an enclosed channel for containing said movable member and within which said movable member is slidable in response to gravity and orientation of the apparatus; and
      iii) said locking mechanism is adapted to assume a first configuration in which said movable member is positioned at one end of the channel or a second configuration in which said movable member is positioned at the opposite end of the channel, in that in one of the two configurations said walls and hence said arms extended therefrom are prevented from moving relative to each other by said movable member and in the other configuration said walls and hence said arms extended therefrom are movable relative to each other.

16. A locking structure as claimed in claim 15, where said locking structure is free of an actuable member for controlling locking status thereof.

17. A locking structure as claimed in claim 15, wherein said first wall and said second wall are movable relative to each other at a pivot axis, and the channel being generally elongate in profile extends across the pivot axis.

18. A locking arrangement comprising a first wall defining a first surface and a second wall defining a second surface with the first second surfaces abutting each other, mechanism for locking said first wall against said second wall, and a movable member, wherein said first wall and said second wall are configured to define an enclosed channel for accommodating said movable member such that said movable member is slidable within the channel in response to gravity to said movable member and orientation of said locking arrangement whereby locking or unlocking of locking arrangement is determined by the position of the movable member within the channel, and wherein said locking arrangement is adapted to assume a first configuration in which said movable member is positioned at one end of the channel or a second configuration in which said movable member is positioned at the opposite end of the channel, in that in one of the two configurations said walls are prevented from moving relative to each other by said movable member and in the other configuration said walls and hence said arms extended therefrom are movable relative to each other.

19. A locking structure as claimed in claim 15, where said locking structure is free of an actuable member for controlling locking status thereof.

20. A locking structure as claimed in claim 15, wherein said first wall and said second wall are movable relative to each other at a pivot axis, and the channel being generally elongate in profile extends across the pivot axis.

\* \* \* \* \*